United States Patent Office

3,658,968
Patented Apr. 25, 1972

3,658,968
COMPOSITION AND METHOD OF TREATMENT
Victor J. Lotti, Harleysville, Pa., assignor to
Merck & Co., Inc., Rahway, N.J.
No Drawing. Filed June 11, 1970, Ser. No. 45,554
Int. Cl. A61k 27/00
U.S. Cl. 424—317
24 Claims

ABSTRACT OF THE DISCLOSURE

A composition and a method for compensating for a dopamine deficiency in the brain tissue of an animal by administering to the animal my-tyrosine or its salts. Preferably, m-tyrosine is used in conjunction with a decarboxylase inhibitor such as α-hydrazino-α-substituted-3,4-dihydroxyphenylpropionic acid or its salts wherein the substituent is hydrogen or lower alkyl. The use of such compounds compensates for a dopamine deficiency in the brain tissue which tends to alleviate some of the symptoms caused by Parkinsonism, manganese poisoning and similar diseases.

---

The present invention relates to a novel and useful composition and to a method of treatment which compensates for a dopamine deficiency in the brain tissues of animals. More particularly, it relates to a composition and a method wherein m-tyrosine (or its salts) is administered to an animal. Preferably, m-tyrosine is administered in combination with a decarboxylase inhibitor such as α - hydrazino-α-substituted-3,4-dihydroxyphenylpropionic acid or its salts, wherein the substituent is hydrogen or lower alkyl.

A dopamine deficiency has been demonstrated to occur in certain nuclei of the brain tissue in patients with Parkinsons disease. Dopamine is 3,4-dihydroxyphenylethylamine of the structure

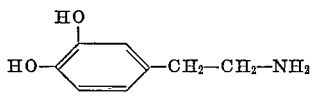

A dopamine deficiency in the corpus striatum results in increased mucular tension and akinesia which is defined as the absence or disturbance of motion in a muscle. This is characterized by the rigidity of limbs and difficulty in walking, sitting, standing, etc. noted in Parkinson syndrome.

It was first suggested that perhaps dopamine could be administered directly to the animal to compensate for the deficiency. However, a natural blood-brain barrier in the body prevented the absorption in brain tissue. It was then proposed that a metabolic precursor of dopamine be utilized with the body changing the precursor into dapamine after it has traversed the blood-brain barrier. Accordingly, racemic dopa was employed for this purpose as it was a known precursor of dopamine. Dopa is 3,4-dihydroxylpehnylalanine of the formula

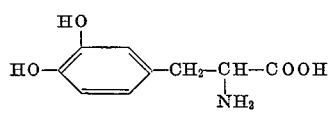

and is known to be racemic due to its asymmetric carbon atom. In employing dopa to increaes the dopamine content of brain tissue numerous side effects were encountered such as nausea and vomiting, as well as hypertension in some instances and hypotension in others. Also noted were certain changes in blood chemistry which have not been fully explained. However, the overall results ranged from poor to excellent in alleviating muscular tension and akinesia.

An effort to minimize side effects led to a separation of the dopa, which is racemic, into its D and L forms with subsequent testing of each. It was found that L-dopa was far more effective and resulted in less side effects than the use of D-dopa. Accordingly, L-dopa has now been experimentally accepted as a treatment for the muscular tension and akinesia but it too produces side effects (such as nausea and vomiting) in certain patients due to the fact that it must be administered in quite high dosage levels, i.e. 4–8 grams/day. Obviously, if a compound could be found which was more active than L-dopa it would receive widespread acceptane in the art.

It is an object of the present invention to provide a compound which is more active than L-dopa for compensating for a dopamine deficiency in the brain tissue of animals. A further object is to provide a combination of drugs which still further compensates for a dopamine deficiency in the brain tissue of animals. Other objects will become apparent as the description of the invention proceeds.

These objects are accomplished by the present invention which provides a method of compensating for a dopamine deficiency in the brain tissue of an animal which comprises administering to the animal a compound selected from the group consisting of m-tyrosine and the pharmaceutically acceptable salts thereof.

The present invention also provides a method of compensating for a dopamine deficiency in the brain tissue of an animal which comprises administering to the animal a compound (A) selected from the group consisting of m-tyrosine and the pharmaceutically acceptable salts thereof in combination with (B) a decarboxylase inhibitor. In a preferred embodiment of the present invention, the decarboxylase inhibitor is an L-α-hydrazino-α-substituted-3,4-dihydroxyphenylpropionic acid, wherein the substituent is H or lower alkyl, and the pharmaceutically acceptable salts thereof.

The present invention further provides a composition comprising a compound selected from the group consisting of m-tyrosine and the pharmaceutically acceptable salts thereof in combination with an inert pharmaceutically acceptable diluent.

The present invention still further provides a composition comprising a compound (A) selected from the group consisting of m-tyrosine and the pharmaceutically acceptable salts thereof in combination with (B) a decarboxylase inhibitor. In a preferred embodiment of the present invention, the decarboxylase inhibitor is an L-α-hydrazino-α-substituted - 3,4 - dihydroxyphenylpropionic acid, wherein the substituent is H or lower alkyl, and the pharmaceutically acceptable salts thereof.

The m-tyrosine employed in the present invention has the structural formula

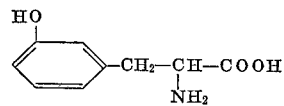

Since m-tyrosine has an asymmetric carbon atom, it exists as a racemic mixture and contains both the D and the L stereoisomers. The compound can be employed as a racemate but it is preferred that the L stereoisomer be used since it is most probable that it constitutes the total activity of the racemate.

The exact mechanism of reaction of the m-tyrosine in the body is not known and the applicant does not wish to be bound by any theory in this regard. However, it is speculated that m-tyrosine is decarboxylated in the body to form m-tyramine. m-Tyramine has the formula

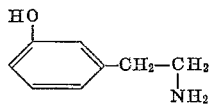

It is further speculated that the m-tyramine acts as a substitute for the dopamine in the brain but is more active than dopamine. On the other hand, it is also possible that the m-tyrosine undergoes hydroxylation in the body to give L-dopa which is then decarboxylated to dopamine. In any event, m-tyrosine is more potent than the previously employed L-dopa.

The "decarboxylase inhibitors" employed in the present invention are well known in the art as shown by U.S. Pats. 2,868,818, 3,178,476, 3,395,176, 3,462,536; Belgian Pats. 737,418, 737,419, 737,420; Glamkowski et al. "Journal of Medicinal Chemistry," vol. 10 (1967), pp. 852, 855; Porter et al. "Biochemical Pharmacology," vol. 11 (1962), pp. 1067–1077; and Clark "Pharmacological Reviews," vol. 11 (1959), pp. 330–349. Preferably, the decarboxylase inhibitors are those which do not pass the blood-brain barrier and which inhibit the decarboxylation of aromatic amino acids. A preferred class of inhibitors are those given in the aforementioned patents and articles wherein the inhibitor contains the

group. The most preferred inhibitors are given in U.S. Pat. 3,462,536.

In a preferred embodiment of the present invention the m-tyrosine is employed in combination with α-hydrazino-α-substituted-3,4-dihydroxyphenylpropionic acid, wherein the substituent is H or lower alkyl, or its pharmaceutically acceptable salts. Such compounds have the following structural formula

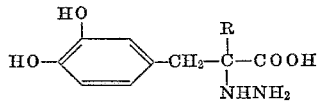

wherein R is H or lower alkyl.

In a still more preferred embodiment of the present invention both the m-tyrosine and hydrazine compounds are employed in the L form and the drugs are administered orally. Preferably, the drugs are administered sequentially with the α - hydrazino-α-substituted-3,4-dihydroxyphenylpropionic acid being given a few minutes to about 5 hours prior to the administration of m-tyrosine. As a practical matter, however, the drugs are generally given simultaneously in a single pill or capsule. The combination is usually given in amounts of from about 5 to about 200 mg./kg. of body weight with the ratio of m-tyrosine to the hydrazine compound being from about 0.2 to about 8, preferably about 0.5 to about 6 with about 2 being the optimum ratio (weight basis).

In a preferred embodiment of the present invention, the hydrazine compound is α-hydrazino-α-methyl - 3,4 - dihydroxyphenylpropionic acid or α-hydrazino-3,4-dihydroxyphenylpropionic acid. With the latter compound either the D or L isomers may be used as well as the racemate since both compounds are active. With the former compound, only the L isomer of the compound is active.

The pharmaceutically acceptable salts of the drugs which may be used include, without limitation, the alkali metal and ammonium salts of the carboxy function and the hydrochloride, hydrobromide, sulfate and the like salts of the amino function. The term "lower alkyl" means an alkyl group containing from 1 to about 4 carbon atoms. In one of the preferred embodiments of the present invention, the free base compounds are used and not the salts.

The invention will now be described by reference to the following examples in which all parts are expressed in parts by weight unless otherwise indicated.

EXAMPLES 1–15

In order to test the effectiveness of L-dopa, m-tyrosine and m-tyrosine in combination with the hydrazine compound, the method of Anden and co-workers is employed (Anden, N., Dahlstrom, A., Fuxo, K., and Larsson, K. "Acta Pharmacol. et Toxicol.," vol. 24, pp. 263–274 (1966)). The compounds, in the indicated dose, are administered intraperitoneally or orally (as indicated) to mice with appropriate unilateral brain lesions which cause the mice to circle in the direction of the lesion showing effectiveness of the drug. This effect is believed to result from the L-dopa or the m-tyrosine being decarboxylated by the body into the corresponding amine (dopamine or m-tyramine) which acts upon the corpus striatum of the intact side of the mouse. The beneficial effect of L-dopa or m-tyrosine in Parkinsonian patients is also believed to result from the action of dopamine or m-tyramine upon the corpus striatum.

The results are given in the tables below.

TABLE 1

[Comparison of the action of L-Dopa and DL-m-tyrosine in mice with corpus striatal brain lesions]

| Example | Treatment | Dose mg./kg. i.p. | No. mice deviating or circling/No. mice tested, hours after treatment | | | |
|---|---|---|---|---|---|---|
| | | | ½ | 1 | 2 | 3 | 4 |
| 1 | Methocel | | 1/20 | 1/20 | 1/20 | 0/20 | 0/20 |
| 2 | } DL-m-tyrosine { | 125.0 | 1/10 | 3/10 | 0/10 | 0/10 | 0/10 |
| 3 | | 250.0 | 1/10 | 4/10 | 2/10 | 0/10 | 0/10 |
| 4 | | 500.0 | 8/10 | 8/10 | 4/10 | 0/10 | 0/10 |
| | | ED$^a_{50}$—260 mg./kg. (1 hour) | | | | | |
| 5 | } L-Dopa { | 250.0 | 0/10 | 3/10 | 2/10 | 0/10 | 0/10 |
| 6 | | 500.0 | 4/10 | 7/10 | 5/10 | 5/10 | 1/10 |
| 7 | | 1,000.0 | 3/10 | 6/10 | 4/10 | 4/10 | 2/10 |
| | | ED$^a_{50}$—380 mg./kg. (1 hour) | | | | | |

$^a$ ED$_{50}$ determined graphically from log dose response curves.

As shown by Table 1, the DL-m-tyrosine (ED$_{50}$—260 mg./kg.) is about 1½ times as active as L-dopa (ED$_{50}$—380 mg./kg.).

TABLE 2

[Comparison of the effect of L-α-hydrazino-α-methyl-3,4-dihydroxyphenylpropionic acid (HMD) upon the action of L-Dopa and DL-m-tyrosine in mice with corpus striatal brain lesions]

| Example | Pretreatment (1 hour) | Treatment | Dose, mg./kg. i.p. | No. mice deviating or circling/No. mice tested, hours after treatment | | | |
|---|---|---|---|---|---|---|---|
| | | | | 1 | 2 | 3 | 4 |
| 8 | Methocel | Methocel | | 0/10 | 0/10 | 0/10 | 0/10 |
| 9 | HMD (25 mg./kg. p.o.) | Methocel | | 1/10 | 1/10 | 1/10 | 1/10 |
| 10 | } HMD (25 mg./kg. p.o.) { | DL-m-tyrosine { | 37.5 | 4/10 | 3/10 | 2/10 | 0/10 |
| 11 | | | 75.0 | 6/10 | 4/10 | 2/10 | 1/10 |
| 12 | | | 150.0 | 7/9 | 7/9 | 3/9 | 1/9 |
| | | ED$^a_{50}$ 54.0 mg./kg. (1 hour) | | | | | |
| 13 | } HMD (25 mg./kg. p.o.) { | L-Dopa { | 75.0 | 2/10 | 2/10 | 0/10 | 0/10 |
| 14 | | | 150.0 | 8/10 | 8/10 | 5/10 | 1/10 |
| 15 | | | 300.0 | 10/10 | 10/10 | 9/10 | 6/10 |
| | | ED$^a_{50}$ 118.0 mg./kg. (1 hour) | | | | | |

$^a$ ED$_{50}$ determined graphically from log dose response curves.

As shown by the table, DL-m-tyrosine in combination with L-α-hydrazino-α-methyl-3,4 - dihydroxyphenylpropionic acid ($ED_{50}$—54 mg./kg.) is about two times as active as L-dopa in combination with the same hydrazine compound ($ED_{50}$—118 mg./kg.).

While the above examples only the use of m-tyrosine and m-tyrosine in combination with the hydrazine compounds has been shown, it should be noted that the compounds would generally be utilized with other drugs such as L-dopa, tranquilizers, anti-cholinergic agents, muscle relaxants, anti-histamines, monoamine oxidase inhibitor to potentiate the drug or alleviate other symptoms of Parkinsonium and like diseases.

Many other equivalent modifications of the invention would be apparent to those skilled in the art from a reading of the foregoing without a departure from the inventive concept.

What is claimed is:

1. A method of compensating from a dopamine deficiency in the brain tissue of an animal which comprises administering to the animal an effective amount of a compound selected from the group consisting of m - tyrosine and a pharmaceutically acceptable salt thereof.

2. A method of compensating for a dopamine deficiency in the brain tissue of an animal which comprises administering to the animal a compound (A) selected from the group consisting of m-tyrosine and a pharmaceutically acceptable salt thereof in combination with a compound (B) selected from the group consisting of L-α-hydrazino-α-substituted - 3,4 - dihydroxyphenylpropionic acid, wherein the substituent is H or lower alkyl, and a pharmaceutically acceptable salt thereof wherein said compounds are presented in an amount sufficient to compensate for the said dopamine deficiency.

3. The method of claim 2 wherein the compound (A) is a racemate.

4. The method of claim 2 wherein the compound (A) is in the L stereo configuration.

5. The method of claim 2 wherein the compound (B) is racemic α-hydrozino-α-methyl-3,4-dihydroxyphenylpropionic acid.

6. The method of claim 2 wherein the compound (B) is L-α-hydrazino-α-methyl - 3,4 - dihydroxyphenylpropionic acid.

7. The method of claim 2 wherein the compound (B) is racemic α - hydrazino - 3,4 - dihydroxyphenylpropionic acid.

8. The method of claim 2 wherein the compound (B) is L-α-hydrazino - 3,4 - dihydroxyphenylpropionic acid.

9. The method of claim 2 wherein the ratio of compound (A) to compound (B) is from about 0.2 to about 8.

10. The method of claim 2 wherein the ratio of compound (A) to compound (B) is from about 0.5 to about 6.

11. The method of claim 2 wherein the ratio of compound (A) to compound (B) is about 2.

12. The method of claim 2 wherein the compounds are administered orally.

13. The method of claim 2 wherein the compounds are administered sequentially.

14. The method of claim 2 wherein the compounds are administered simultaneously.

15. A composition for compensating for a dopamine deficiency in the brain tissue of an animal comprising a compound (A) selected from the group consisting of m-tyrosine and a pharmaceutically acceptable salt thereof in combination with a compound (B) selected from the group consisting of L-α-hydrazino - α - substituted-3,4-dihydroxyphenylpropionic acid, wherein the substituent is H or lower alkyl, and a pharmaceutically acceptable salt thereof wherein said compounds are present in an amount sufficient to compensate for the said dopamine deficiency.

16. The composition of claim 15 wherein the compound (A) is a racemate.

17. The composition of claim 15 wherein the compound (A) is in the L stereo configuration.

18. The composition of claim 15 wherein the compound (B) is racemic α-hydrazino-α-methyl - 3,4 - dihydroxyphenylpropionic acid.

19. The composition of claim 15 wherein the compound (B) is L-α-hydrazino - α - methyl-3,4-dihydroxyphenylpropionic acid.

20. The composition of claim 15 wherein the compound (B) is racemic α-hydrazino-3,4-dihydroxyphenylpropionic acid.

21. The composition of claim 15 wherein the compound (B) is L-α-hydrazino - 3,4 - dihydroxyphenylpropionic acid.

22. The composition of claim 15 wherein the ratio of compound (A) to compound (B) is from about 0.2 to about 8.

23. The composition of claim 15 wherein the ratio of compound (A) to compound (B) is from about 0.5 to about 6.

24. The composition of claim 15 wherein the ratio of compound (A) to compound (B) is about 2.

References Cited

UNITED STATES PATENTS

| | | | |
|---|---|---|---|
| 3,178,476 | 4/1965 | Hegedüs et al. | 424—324 |
| 3,360,434 | 12/1967 | Vdenfriend et al. | 424—319 |
| 3,462,536 | 8/1969 | Chemerda | 424—309 |

OTHER REFERENCES

Chem. Abst. (1), 59, 7982d (1963).
Chem. Abst. (2), 66, 74853 Q (1967).

STANLEY J. FRIEDMAN, Primary Examiner

U.S. Cl. X.R.

424—319

UNITED STATES PATENT OFFICE
CERTIFICATE OF CORRECTION

PATENT NO. : 3,658,968
DATED : April 25, 1972
INVENTOR(S) : Victor J. Lotti

It is certified that error appears in the above-identified patent and that said Letters Patent are hereby corrected as shown below:

Column 4, Table 1, Example 7 under Column 2 - Delete [4/10] and insert in its place 6/10.

Column 5, Claim 1, line 19 - Delete [from] and insert in its place for.

Column 5, Claim 1, line 23 - "m-tyrosine" should read "L-m-tyrosine".

Column 5, Claim 2, line 34 - Delete [presented] and insert in its place present.

Signed and Sealed this tenth Day of February 1976

[SEAL]

Attest:

RUTH C. MASON
Attesting Officer

C. MARSHALL DANN
Commissioner of Patents and Trademarks